(No Model.)

M. LACHMAN.
FURNITURE CASTER.

No. 571,167.  Patented Nov. 10, 1896.

Attest:
George H Botts
C. J. Sawyer

Inventor:
Maurice Lachman
By Philipp Munson & Phelps
Attys.

UNITED STATES PATENT OFFICE.

MAURICE LACHMAN, OF LONDON, ENGLAND, ASSIGNOR TO THE AUTOMATIC CASTOR AND WHEEL COMPANY, LIMITED, OF SAME PLACE.

FURNITURE-CASTER.

SPECIFICATION forming part of Letters Patent No. 571,167, dated November 10, 1896.

Application filed December 31, 1895. Serial No. 573,881. (No model.) Patented in England April 29, 1893, No. 8,661, and in France April 21, 1894, No. 237,938.

*To all whom it may concern:*

Be it known that I, MAURICE LACHMAN, gentleman, of St. George's Club, Hanover Square, London, in the county of London, England, have invented certain new and useful Improvements in Furniture-Casters, (for which I have received Letters Patent in Great Britain, No. 8,661, dated April 29, 1893, and in France No. 237,938, dated April 21, 1894,) of which the following is a specification.

The object of this invention is to simplify the construction of casters, to insure the fixing of the parts in their proper relative positions, and otherwise to improve the working of the same.

In carrying out this invention the pivot-pin of the caster is provided with a flat or rounded head in the usual way, and the lower end of the pin is coned out for a purpose to be presently explained.

The pivot-pin receives a sleeve, which has an external flange at one end, the inner edge at the same end being slightly coned or countersunk. The sleeve receives the wheel-frame or horn, and above the horn is mounted a loose annular disk or plate having flanges on its inner and outer edges projecting in opposite directions. This disk or plate is slotted or recessed to receive small rollers, or it may be balls, which, when the parts are assembled, will lie between the socket and the horn and form a roller-bearing to the latter.

When the parts are assembled, they are placed in a suitable support, and a punch is caused to descend into the coned end of the pivot-pin, which spreads out the end of the pin into the countersunk portion of the sleeve, and thus rivets the parts together. The sleeve will definitely gage the distance between the socket and the horn and will thus insure the proper relative positions of the parts, so as to provide for the easy working of the rollers or balls.

The rollers employed are cylindrical, and the slots in the disk may be slightly rounded.

Figure 1:
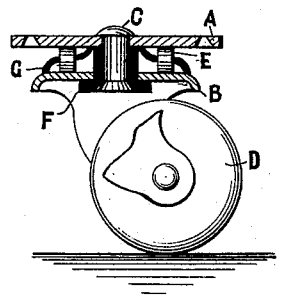
Figure 2:
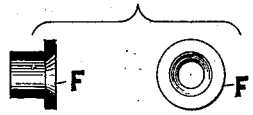
Figure 3:
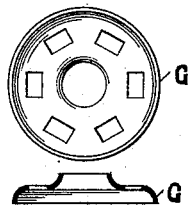

In the accompanying drawings, Figure 1 is a side elevation, partly in section, of a caster constructed according to my invention. Figs. 2 and 3 show details which will be subsequently referred to.

A is the socket or fixing plate, and B is the wheel-frame or horn.

C is the pivot-pin.

D is the wheel.

E are cylindrical rollers placed between the socket A and the frame B to reduce friction.

F is the sleeve, and G is a recessed guide-plate to hold the rollers in their proper position.

Fig. 2 shows in section and end view the sleeve F.

Fig. 3 shows the form of the recessed guide-plate G in under side plan view and cross-section. This guide-plate is formed of an annular disk or plate with the inner and outer edges turned in opposite directions to form flanges and with recesses for the cylindrical rollers. The depth of the flanges is such that the plate will exactly fit in between the socket A and the frame B when the parts are assembled together, and it is free to rotate on the pivot.

In putting the parts together the sleeve F is first inserted from the under side in the hole of the frame B. The plate G is then placed on the sleeve with the larger diameter flange downward and the rollers are inserted in position. The socket is then placed in position, and the pivot-pin is introduced from above, or the operation may be reversed. When the parts are thus assembled, they are placed in a press in an inverted position, and the end of the pivot-pin is spread out by a suitable punch, so as to rivet the parts together.

In the position shown at Fig. 1 the guide-plate rests on the frame B and prevents the collection of dust and dirt on the running-surface for the rollers, which would interfere with the proper working of the same.

By the use of the flanged sleeve F it will be seen that during the manufacture the proper distance between the socket A and the frame B will always be automatically gaged. This sleeve also gives a broad bearing for the plate A and the horn B and prevents the pin, with the strain of use, from tearing out of the socket or plate A, which, being of comparatively thin metal, the pin is likely to do unless the plate is reinforced by the sleeve.

The parts A and B will be stamped out of sheet metal in the manner now well understood.

What I claim is—

1. The combination with a caster provided with antifriction-rollers placed between the socket and horn, of a sleeve to automatically gage the distance between the socket and horn, and a double-flanged guide-plate for the rollers, arranged with the flange of larger diameter downward, to prevent the collection of dirt on the running-surface for the rollers, as herein set forth.

2. In a caster provided with antifriction-rollers, the combination with a socket, horn, and pivot-pin, of a flanged sleeve to automatically gage the distance between the socket and the horn, and to prevent the pivot-pin tearing away from the caster during usage, as shown and described.

3. In a caster provided with antifriction-rollers, the combination with a socket, horn and pivot-pin, of a flanged sleeve on the pivot-pin having its flange extending beneath the plate of the horn and its upper end bearing against the under side of the socket-plate, and having its flanged end countersunk to receive the expanded end of the pin to hold the parts together, as shown and described.

4. In a caster provided with antifriction-rollers, the combination with a socket, a horn, and a pivot-pin, of a double-flanged guide-plate turning loose on the pivot, and having the flange of larger diameter downward, so as to prevent the collection of dust or dirt on the running-surfaces for the rollers, as shown and described.

MAURICE LACHMAN.

Witnesses:
H. K. WHITE,
JOSEPH LAKE.